(No Model.)

A. R. GOURRIER & J. M. THOMPSON.
CANE SCRAPER.

No. 327,676. Patented Oct. 6, 1885.

WITNESSES:
Chas. Nida
C. Sedgwick

INVENTOR:
A. R. Gourrier
J. M. Thompson
BY Munn & Co
ATTORNEYS.

UNITED STATES PATENT OFFICE.

ALFRED RICHARDSON GOURRIER AND JOSEPH MILBERN THOMPSON, OF DORCYVILLE, LOUISIANA.

CANE-SCRAPER.

SPECIFICATION forming part of Letters Patent No. 327,676, dated October 6, 1885.

Application filed June 16, 1885. Serial No. 168,877. (No model.)

*To all whom it may concern:*

Be it known that we, ALFRED RICHARDSON GOURRIER, of Dorcyville, in the parish of Iberville and State of Louisiana, and JOSEPH MILBERN THOMPSON, of the same place, have invented a new and useful Improvement in Cane-Scrapers, of which the following is a full, clear, and exact description.

Reference is to be had to the accompanying drawings, forming a part of this specification, in which similar letters of reference indicate corresponding parts in all the figures.

Figure 1:
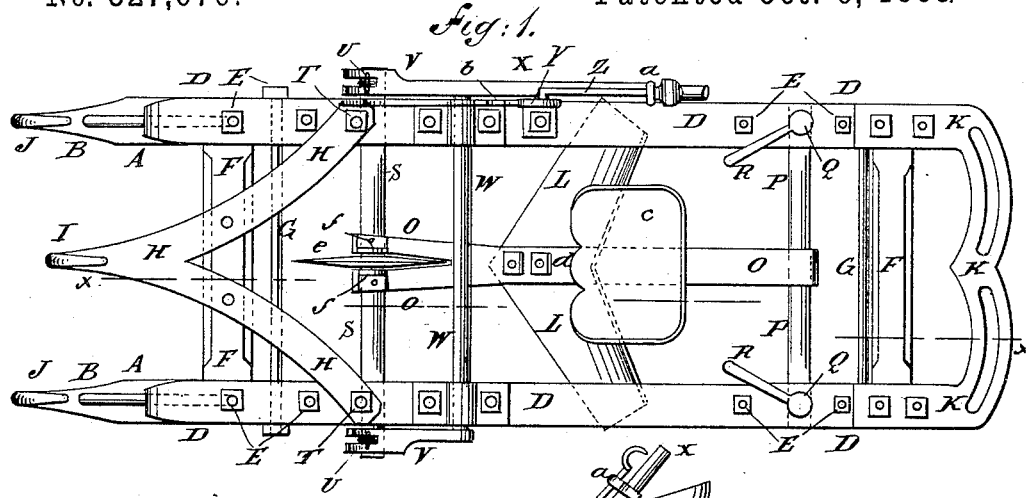
Figure 2:
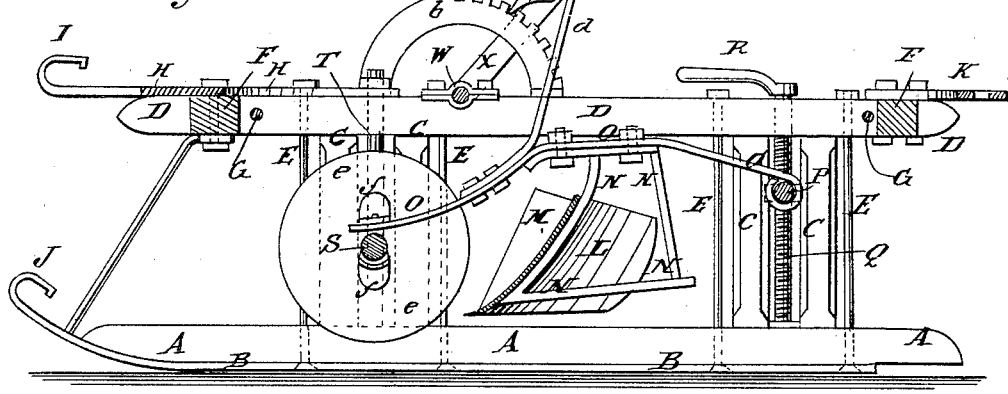
Figure 3:
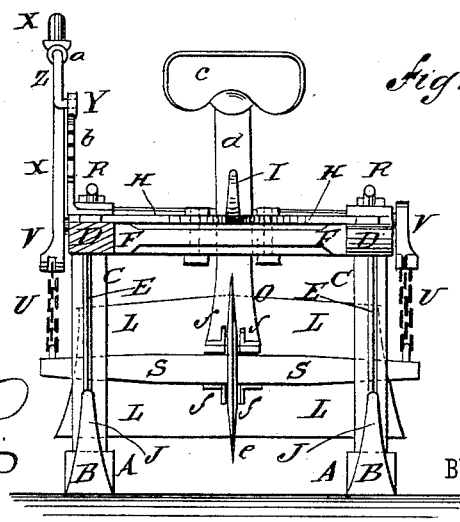

Figure 1 is a plan view of one of our improved cane-scrapers. Fig. 2 is a sectional side elevation of the same, taken through the line $x\ x$, Fig. 1. Fig. 3 is a front elevation of the same, partly in section.

The object of this invention is to provide cane-scrapers constructed in such a manner that they can be readily adjusted to remove the soil to any desired depth and leave the tops of the ridges smooth.

The invention consists in the construction and combination of various parts of the cane-scraper, as will be hereinafter fully described, and then claimed.

A A are two runners, to the lower sides of which are attached metal shoes B, to prevent wear, and which are connected by posts C with the top side bars or raves, D. The runners A and raves D are further connected by long bolts or rods E passing through the said runners and raves, and which also pass through the shoes B and hold them in place upon the said runners. The raves D are connected by beams F and by long bolts or tie-rods G.

The forward part of the frame is further strengthend by the draw-bar H, the rear part of which is forked and is bolted to the raves D and forward beam, F. The forward end of the draw-bar H projects, and has a hook, I, formed upon it to receive the draft attachment.

The forward ends of the shoes B project in front of the runners A, and have hooks J formed upon them to receive the draft attachment, so that the draft can be applied to the upper or the lower part of the machine, as may be desired.

L is the plow or scraper, which is made with two wings or mold-boards, and is provided at its central line or angle with a divider or stationary colter, M, to divide or separate the soil to be removed, and to cut any roots or vines that may be growing in the said soil to prevent the said roots or vines, when struck by the scraper, from tearing away the soil to too great a depth. The double-winged plow or scraper L is attached to a frame, N, the top bar of which is bolted to the middle part of the bar O. The rear end of the bar O has an eye formed in it to receive the bar P, the ends of which have screw-holes formed in them to receive the screws Q. The screws Q are swiveled to the runners A and raves D, and to their upper ends are attached or upon them are formed cranks R, by means of which the swiveled screws Q can be turned to raise or lower the rear end of the plow-bar O, and with it the rear part of the double-winged scraper L. The forward end of the plow-bar O is forked, and is secured by bolts or rivets to the bar S, the ends of which are perforated to receive and slide upon the rods T. The lower ends of the rods T are secured to the runners A, and their upper ends are secured to the raves D. The ends of the bar S project, and to them are attached the lower ends of short chains U, the upper ends of which are inserted in slots formed in the forward ends of the arms V. The upper ends of the arms V are formed upon or rigidly attached to the ends of the shaft W, which rocks in bearings attached to the raves D, and to one of its ends is attached, or upon it is formed, a lever, X, so that by operating the said lever the bar S and the forward end of the plow-bar O, and with them the forward part of the scraper L, can be raised or lowered, as may be required. The lever X is locked in any position into which it may be adjusted by a pawl, Y, pivoted to the said lever, and operated by a rod, Z, sliding in a keeper, $a$, attached to the said lever. The pawl Y engages with a toothed bar, $b$, attached to the rave D.

$c$ is the driver's seat, which is attached to the upper end of the standard $d$. The lower end of the standard $d$ is attached to the forward part of the bar O, that carries the scraper L.

Upon the middle part of the bar S, and within the slot of the bar O, is placed a circular rotary cutter, e, which is kept in a vertical position by angle-irons f, attached to the upper side of the forward end of the bar O and the lower side of the bar S, as shown in Figs. 1, 2, and 3. To the rear ends of the raves D of the frame of the scraper are detachably secured by bolts the ends of a metal plate, K, which is slotted to receive bolts for fastening a right and left hand plow to the scraper-frame, when desired, for further clearing out the water-furrows between the rows.

Having thus described our invention, we claim as new and desire to secure by Letters Patent—

1. The combination, with a frame having runners, and the double-winged scraper L, of the bar O, attached to the scraper-frame N, and the bar and swiveled screws P Q, connected with the rear end of said bar, and the bar, chains, armed shaft, and lever connected with the forward end of the said bar, substantially as herein shown and described.

2. In a cane-scraper, the combination, with the frame having runners, and the rear end of the bar O, carrying the double-winged scraper, of the bar P, having screw-holes in its ends, and the swiveled screws Q, substantially as herein shown and described, whereby the heel of the scraper can be readily raised or lowered, as set forth.

3. In a cane-scraper, the combination, with the frame having runners, the slide-rods T, and the forward end of the bar O, carrying the scraper, of the bar S, the short chains U, the shaft W, having arms V, and the lever X, substantially as herein shown and described, whereby the point of the scraper can be readily raised and lowered, as set forth.

4. In a cane-scraper, the combination, with the forward end of the bar O, carrying the scraper, and the bar S, carrying the said forward end, of the rotary circular colter e and the angle-irons f, substantially as herein shown and described, whereby the soil, grass, weeds, and vines will be cut in advance of the said scraper, as set forth.

ALFRED RICHARDSON GOURRIER.
JOSEPH MILBERN THOMPSON.

Witnesses:
ADOLPHUS BROWN,
ED. HENDERSON.